United States Patent
Cosby et al.

(10) Patent No.: US 11,062,417 B2
(45) Date of Patent: Jul. 13, 2021

(54) SYSTEMS AND METHODS FOR APPLYING DATA OPTIMIZATION TO IMAGES TO MEET A COMPUTER VISION REQUIREMENT

(71) Applicant: Lenovo Enterprise Solutions (Singapore) Pte. Ltd., New Tech Park (SG)

(72) Inventors: David Wayne Cosby, Research Triangle Park, NC (US); Jian Li, Research Triangle Park, NC (US); Jianbang Zhang, Research Triangle Park, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 73 days.

(21) Appl. No.: 16/550,719

(22) Filed: Aug. 26, 2019

(65) Prior Publication Data
US 2021/0065326 A1 Mar. 4, 2021

(51) Int. Cl.
*G06K 9/00* (2006.01)
*G06T 1/00* (2006.01)
*G06T 7/00* (2017.01)

(52) U.S. Cl.
CPC ........ *G06T 1/0014* (2013.01); *G06K 9/00744* (2013.01); *G06K 9/00765* (2013.01); *G06T 7/0002* (2013.01)

(58) Field of Classification Search
CPC . G06T 1/0014; G06T 7/0002; G06K 9/00744; G06K 9/00765

USPC ......................................................... 382/103
See application file for complete search history.

(56) References Cited

U.S. PATENT DOCUMENTS

| 8,379,914 B2 * | 2/2013 | Nepomniachtchi ........................ G06Q 20/3276 382/102 |
| 8,456,380 B2 | 6/2013 | Pagan |
| 2015/0154934 A1* | 6/2015 | Spitzer ...................... G06F 3/03 345/618 |
| 2016/0173752 A1* | 6/2016 | Caviedes ........... H04N 5/23241 348/207.11 |

OTHER PUBLICATIONS

Toma, Anas, et al. "Adaptive Quality Optimization of Computer Vision Tasks in Resource-Constrained Devices using Edge Computing." CCGRID. 2019. (Year: 2019).*

(Continued)

*Primary Examiner* — Jonathan S Lee
(74) *Attorney, Agent, or Firm* — Olive Law Group, PLLC

(57) ABSTRACT

Systems and methods for applying data optimization to images to meet a computer vision requirement are disclosed. According to an aspect, a method includes determining a computer vision requirement of a remote computing device. The method also includes determining, based on the computer vision requirement, a data optimization technique to apply to multiple images. Further, the method includes applying the data optimization technique to one or more of the images to generate data for communication. The method also includes communicating the data to the remote computing device.

20 Claims, 4 Drawing Sheets

(56) References Cited

OTHER PUBLICATIONS

Khan, Arif Ul Maula, Ralf Mikut, and Markus Reischl. "A new feedback-based method for parameter adaptation in image processing routines." PloS one 11.10 (2016): e0165180. (Year: 2016).*

Cui, Yuya, et al. "Novel method of mobile edge computation offloading based on evolutionary game strategy for IoT devices." AEU-International Journal of Electronics and Communications 118 (2020): 153134. (Year: 2020).*

Fang, Zhou, et al. "Multi-tenant mobile offloading systems for real-time computer vision applications." Proceedings of the 20th International Conference on Distributed Computing and Networking. 2019. (Year: 2019).*

Kemp, Roelof, et al. "Cuckoo: a computation offloading framework for smartphones." International Conference on Mobile Computing, Applications, and Services. Springer, Berlin, Heidelberg, 2010. (Year: 2010).*

\* cited by examiner

SYSTEMS AND METHODS FOR APPLYING DATA OPTIMIZATION TO IMAGES TO MEET A COMPUTER VISION REQUIREMENT

TECHNICAL FIELD

The presently disclosed subject matter relates generally to computer vision. Particularly, the presently disclosed subject matter relates to systems and methods for applying data optimization to images to meet a computer vision requirement.

BACKGROUND

Computer vision technology relates to how computers can gain a high-level understanding from digital images or video. Generally, a computer vision function or task includes analyzing a digital image and/or video and determining high-dimensional data or high-level information from the image and/or video. The determined data or information may be used to generate numerical or symbolic information. The understanding of images or video in this way can transform them into descriptions or an understanding of the real world that can interface with other thought processes and elicit appropriate action. This image understanding can be based on use of models constructed with the aid of geometry, physics, statistics, learning theory, and the like.

Implementation of computer vision functions, such as image and video analysis and processing, can require high computing capabilities. In such instances, it may be beneficial for a computing device to offload computer vision functions to a remote computing device, such as a server at a data center. The support of centralized, cloud-based computing capabilities provided by data centers is viewed as being a cost-effective way to deliver computing capacity. Not only does it offer economies of scale, but it enables significant global data integration. However, in the case of performing computer vision functions, performing some functions at edge-based computing devices can provide advantages such as low latency response times and avoidance of expensive bandwidth requirements. Other functions may be offloaded and therefore there is a motivation to better provide improved systems and techniques to enable edge-based computing devices that acquire images and video to offload computer vision functions to remote computing devices, such as servers.

SUMMARY

The presently disclosed subject matter discloses systems and methods for applying data optimization to images to meet a computer vision requirement. According to an aspect, a method includes determining a computer vision requirement of a remote computing device. The method also includes determining, based on the computer vision requirement, a data optimization technique to apply to multiple images. Further, the method includes applying the data optimization technique to one or more of the images to generate data for communication. The method also includes communicating the data to the remote computing device.

According to another aspect, a method includes communicating, to a computer vision analyzer at a remote computing device, data associated with multiple images. The method also includes receiving, from the remote computing device, feedback about usefulness of the data to the computer vision analyzer. Further, the method includes adjusting, based on the feedback, application of a data optimization technique to other images for the computer vision analyzer.

According to another aspect, a method includes receiving data associated with multiple images. The method also includes determining feedback of usefulness of the data to a computer vision analyzer. Further, the method includes communicating the feedback to a computing device for adjusting a data optimization technique applied to other images for the computer vision analyzer.

BRIEF DESCRIPTION OF THE DRAWINGS

Figure 1:
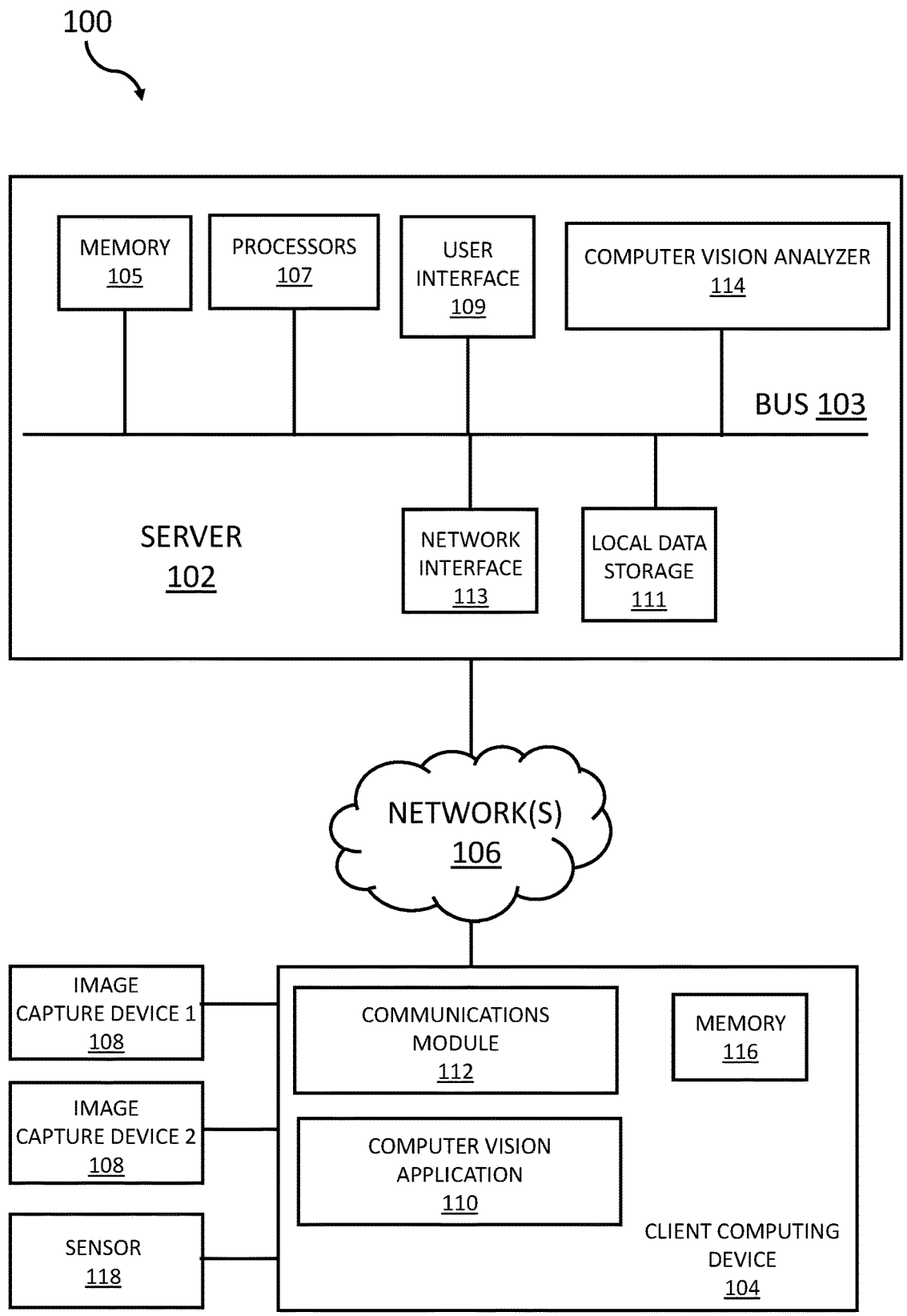
Figure 2:
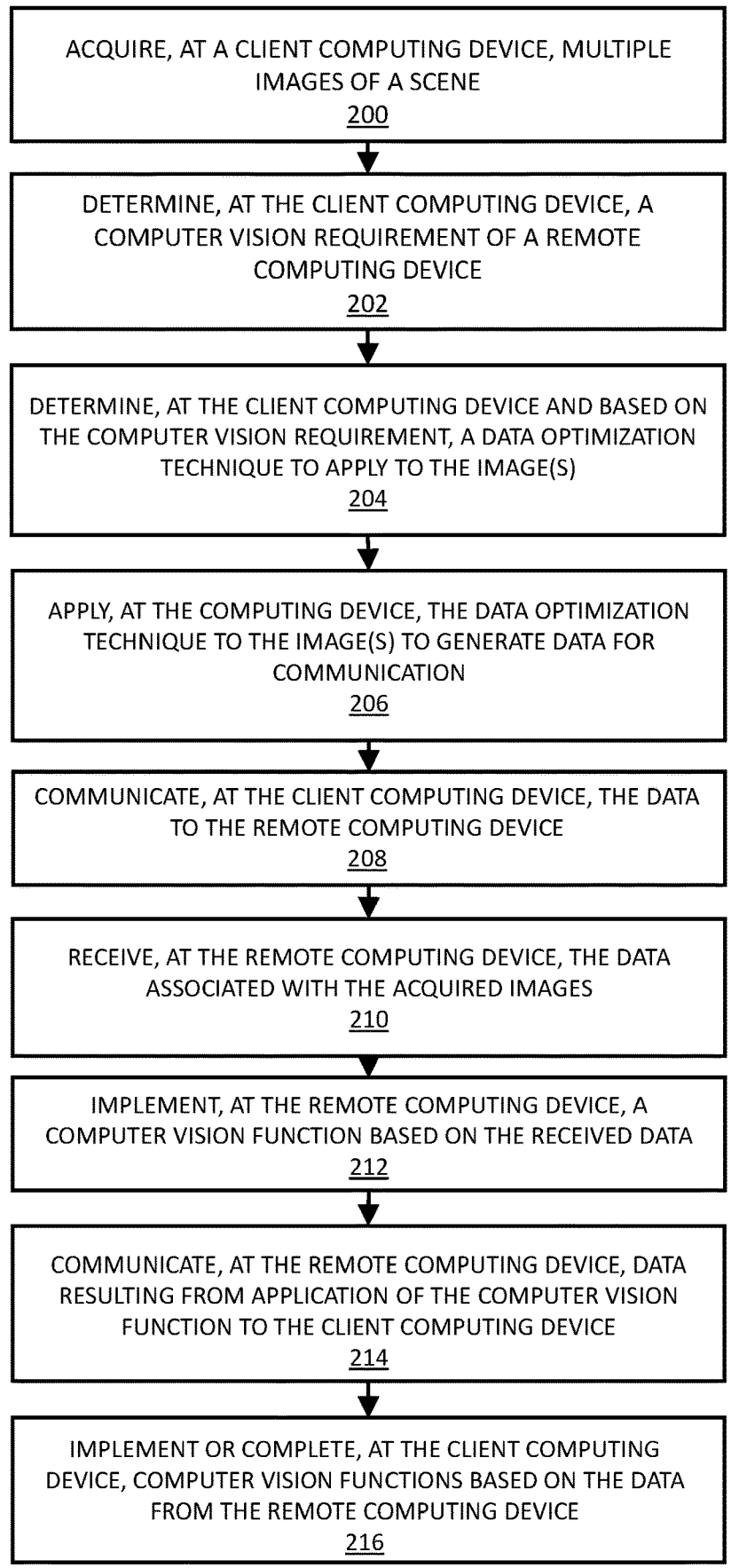
Figure 3:
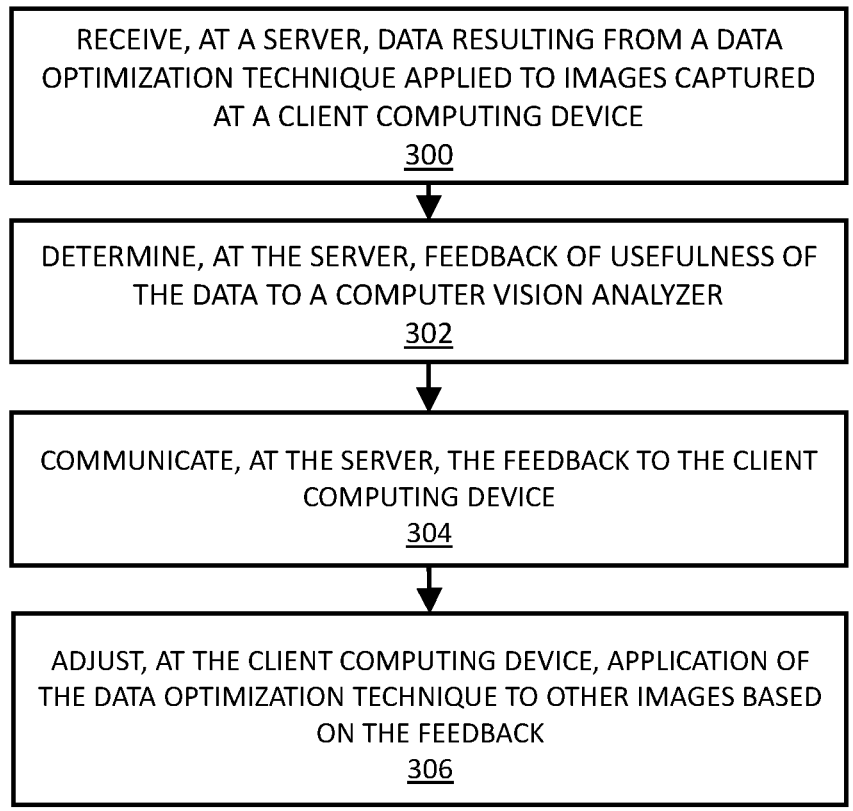
Figure 4:
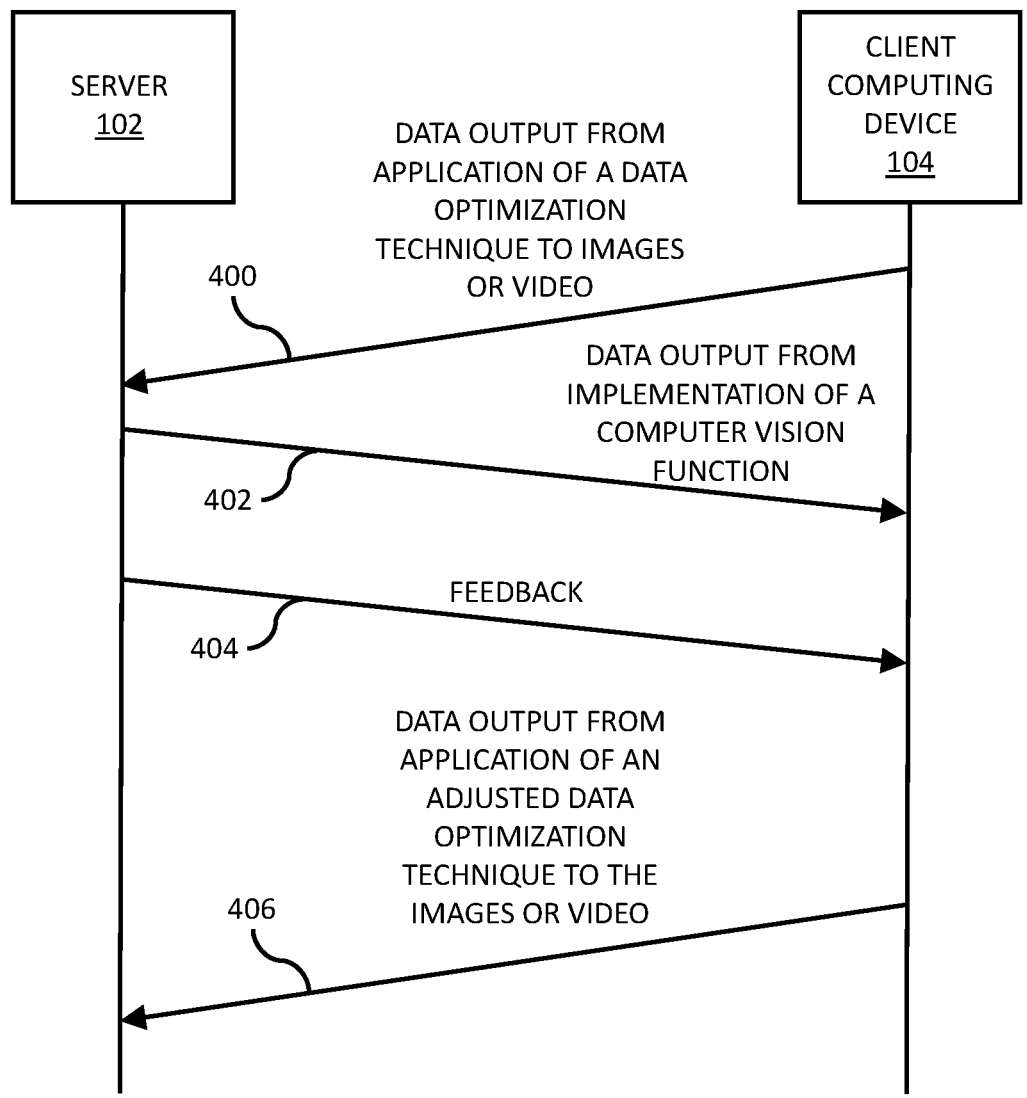

Having thus described the presently disclosed subject matter in general terms, reference will now be made to the accompanying Drawings, which are not necessarily drawn to scale, and wherein:

FIG. 1 is a block diagram of an example system for applying data optimization to images to meet a computer vision requirement in accordance with embodiments of the present disclosure;

FIG. 2 is a flow chart of an example method for applying data optimization to images to meet a computer vision requirement in accordance with embodiments of the present disclosure;

FIG. 3 is a flow chart of an example method for providing feedback about the usefulness of data to a computer visional analyzer in accordance with embodiments of the present disclosure; and FIG. 4 illustrates a message flow diagram showing an example exchange of messages between a server and client computing device for implementing a computer vision function in accordance with embodiments of the present disclosure.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

FIG. 1 illustrates a block diagram of an example system 100 for applying data optimization to images to meet a computer vision requirement in accordance with embodiments of the present disclosure. Referring to FIG. 1, the system 100 includes a server 102 and a client computing device 104 that are communicatively connected via one or more networks 106. The network(s) 106 may be include any suitable network such as, but not limited to, the Internet, a local area network (LAN), a cellular network, and the like. In an example, the server 102 may reside at a data center. Further, for example, the client computing device 104 may have one or more image capture devices 108 operable to capture images and/or video. The client computing device 104 may be, for example, a smartphone, a laptop computer, or other electronic device capable of capturing or acquiring images and/or video.

The server 106 may include a communications bus 103 configured to transfer data between components within the server 106. Components of the server 106 include memory 105, processors 107, a user interface 109, local data storage 111, and a network interface 113. The server 106 may be operable to communicate with other computing devices over the network(s) 106 via its network interface 113.

The client computing device 104 may offload tasks to the server 102 in order to manage its workload. For example, the client computing device 104 may communicate a service request to the server 102 via the network(s) 106. The service request may include or be followed by data for analysis and processing by the server 102. The server 102 may accept the request and subsequently analyze and process the data provided by the computing device 104. The server 102 may then returned the processed data to the computing device 104.

The computing device 104 may capture one or more images and/or video (i.e., a sequence of images) of a scene by use of its image capture devices 108. The image capture devices 108 may be still image or video cameras integrated into the computing device 104 or remotely located from the computing device 104. The field of view (FOV) of the image capture devices 108 may be of the same scene or different scenes.

The computing device 104 may include a computer vision application 110, which may be any application that uses images and/or video to provide information reflecting a high-level understanding of a scene in the images and/or video. In an example, the images and/or video may be acquired by the image capture devices 108 may be received and used by the computer vision application 110 for generating high-level information of a real world environment or scene. For example, the computer vision application 110 may be operable for scene reconstruction, detection of an event, video tracking, recognition of an object in an image or video, motion estimation, restoration of an image in a video, or the like. The computer vision application 110 may be used to obtain a high-level understanding from the acquired images or video to implement one or more of these functions. For example, the computer vision application 110 may extract high-dimensional data from the images or video to produce numerical or symbolic information that can be used as a description of the real world environment of the scene. This information may be used by the computer vision application 110 or another application on the computing device 104 to present the information to a user or otherwise analyze and take action based on the information. The computer vision application 110 may be implemented by hardware, software, firmware, or combinations thereof. For example, the computer vision application 110 may be implemented by one or more processors and memory.

In accordance with embodiments, some or all of the processing of functions of the computer vision application 110 may be offloaded to the server 102. For example, the computer vision functions of scene reconstruction, detection of an event, video tracking, recognition of an object in an image or video, motion estimation, restoration of an image in a video, and/or others may be offloaded to the server 102. In this instance, the computing device may use its communications module 112 to send a service request to the server 102 to assist with a function of the computer vision application 110. The server 102 may receive the request and determine whether or not to accept the service request. Further, the server 102 may communicate an acknowledgement of the service request to the computing device 104 and indicate whether or not the request was accepted.

In order to process a service request, the server 102 may have one or more requirements of data from the computing device 104. These requirements may be referred to as "computer vision requirements". The server 102 may include a computer vision analyzer 114 that can determine computer vision requirements based on a service request. As an example, the computer vision requirement may be based on a sharpness of edges, a smoothness, white balance, exposure or the like of images acquired at computing device 104. In another example, the computer vision requirement may be the high-dimensional data required by the computer vision analyzer 114 to perform a computer vision function requested by the computing device 104. The cloud-based system can provide an optimized object catalog for simplification and/or compression that may not be obvious or efficiently calculated at the edge, but is readily apparent with the benefit of data from multiple edge devices and the processing power in the centralized component. Also, importantly, an intelligent, centralized agent, as an example, may be the actual consumer of this data, so it has capability to isolate specific regions of interest and communicate that to the edge-based device for special processing.

While the client may not be expected to have all the processing capabilities of the centralized element, it can be expected to have object tracking capabilities. In an example client and application server scenario, the application server may be able to identify a person as a "blob" of pixels and subsequently notify the client to not send to it any detailed image data on this blob has met criteria. Example criteria includes, but is not limited to, elapsed time, pixels per second movement, extent of movement, entrance to a keep out region, or any other suitable criteria that may be implemented. When updated data is sent from the client to the application server, a decision can be made at the server about whether that criteria resulted in sufficient information to satisfy the needs of the application. If the data is current and sufficiently populated to satisfy the needs of the application, the criteria for sending updates can be maintained or relaxed next time this instance occurs. If there are gaps in the data, the application server can adjust the parameters that restricted or restarted data by changing them at the edge client and by optionally asking for interim frames cached at the client.

Methods or techniques used by the computer vision analyzer 114 to determine acceptability or suitability of data from a client computing device can vary by the use case. In an example use case, the speed of people, vehicles, or other objects may vary in a camera's field of vision. At the client computing device, this may be managed by increasing the camera's frame rate and quality when movement is detected in the frame. Since these key parameters (e.g., frame rate, max I-frame interval, resolution, etc.) can all have a large impact on the bandwidth requirements, these parameters may be tuned according to the usability of the data. Because the analyzer 114 can have knowledge of whether a received frame or image was usable and the degrees of certainty associated with its processing, it can deploy or implement both algorithmic and AI based tuning of image quality and bandwidth settings. In a more specific example, it may be assumed that the processor is attempting to read two-dimensional barcodes from a forklift with situational awareness. In this specific example, it can not only recognize the images differences from frame-to-frame to derive some idea of speed, but also measure edge blur to quickly modify camera settings, confirm if it is truly a forklift in the field of vision, or perform other analytical tasks. Further, the analyzer 114 may operate with the client computing device to measure, tune and update before the forklift leaves the field of vision so that the capture is successful. Thus, the intelligence of video analytics of the analyzer 114 can help tailor the image collection and transmission by the client computing device.

Now continuing the example of FIG. 1, the server 102 may communicate to the computing device 104 its computer vision requirement(s). The computing device 104 may determine, based on the computer vision requirement, a data optimization technique to apply to the images or video and communicate the data to the server 102. The server 102 may subsequently receive the data, process the data to implement the computer video function, and send the results to the computing device 104.

The computer vision analyzer 114 is shown in FIG. 1 as residing entirely within the server 102, although it should be appreciated that the functionality described for the computer vision analyzer 114 may be distributed among multiple servers that cooperatively operate together for implementing the functionality described for the computer vision analyzer 114. The computer vision analyzer 114 may be implemented by suitable hardware, software, firmware, or combinations thereof. For example, the computer vision analyzer 114 may be implemented by one or more processors and memory.

FIG. 2 illustrates a flow chart of an example method for applying data optimization to images to meet a computer vision requirement in accordance with embodiments of the present disclosure. The method is described by this example implemented by the system 100 shown in FIG. 1; however, it should be understood that the method may be implemented by any other suitable system.

Referring to FIG. 2, the method includes acquiring 200, at a client computing device, multiple images of a scene. For example, the computing device 104 may use one or more of its image capture devices 108 to capture images of a scene. The computer vision application 110 may receive the captured images and store the images in memory.

The method of FIG. 2 includes determining 202, at the client computing device, a computer vision requirement of a remote computing device. Continuing the aforementioned example, the remote computing device may be used for support of a computer vision function to be implemented by the computer vision application 110 on the captured images. The computer vision application 110 may determine a computer vision requirement of the server 102 for supporting the function. For example, the computer vision application 110 may determine high-dimensional data of the images that is required by the computer vision analyzer 114 at the server 102. In another example, the computer vision application 110 may determine a requirement of one of sharpness of edges, smoothness, white balance, and/or exposure required by the computer vision analyzer 114.

The method of FIG. 2 includes determining 204, at the client computing device and based on the computer vision requirement, a data optimization technique to apply to the image(s). Continuing the aforementioned example, the computer vision application 110 of the computing device 104 can determine, based on the computer vision requirement, one among multiple data optimization techniques to apply to the captured images. A data optimization technique may include generation of data from an image by one or more of filtering, compression (e.g., video compression or still image compression), image stitching, thresholding, pixel counting, segmentation, edge detection, color analysis, blob detection and extraction, machine learning, pattern recognition, and the like. In an example, the server 102 may identify the data optimization technique to the computer vision application 110.

The method of FIG. 2 includes applying 206, at the client computing device, the data optimization technique to one or more of the images to generate data for communication. Continuing the aforementioned example, the computer vision application 110 at the computing device 104 may filter, compress, image stitch, apply a threshold, pixel count, segment, edge detect, color analyze, blob detect and extract, apply machine learning, and/or apply pattern recognition to the capture images. The resulting data may be stored in memory 116.

The method of FIG. 2 includes communicating 208, at the client computing device, the data to the remote computing device. Continuing the aforementioned example, the data resulting from the applied data optimization technique may be communicated by the computing device 104 to the server 102 via the network(s) 106. For example, the computer vision application 110 may use the communications module 112 to communicate the stored data resulting from the data optimization technique to the server 102.

The method of FIG. 2 includes receiving 210, at the remote computing device, the data associated with the acquired images. Continuing the aforementioned example, the server 102 may receive the data communicated by the computing device 104.

The method of FIG. 2 includes implementing 212, at the remote computing device, a computer vision function based on the received data. Continuing the aforementioned example, the computer vision analyzer 114 may implement the computer vision function based on data received from the computing device 104. Example computer vision functions include, but are not limited to, reconstruct a scene, detect an event, video track, recognize an object in a video, estimate motion, restore an image in a video, decode a formatted object such as a barcode, identify a face, and the like. Depending on the use case, a large number of image improvement and processing may be implemented. The distribution and management of these functions between the client and server can importantly optimize the operations. In addition, optimizing (e.g., through machine learning feedback loops) the use of those functions between the client and server to properly manage the bandwidth can be important. For example, the analyzer may be configured to (a) confirm the image is marginal/unusable based on the current parameters, then it could possibly; (b) by comparing to the previous image confirm how much motion is present as well as evaluate whether the interesting region of interest is in a poorly lit location; and subsequently (c) adjust the shutter speed and request an immediate I-frame. The computer vision analyzer 114 may generate data resulting from applying the computer vision function to the received data.

The method of FIG. 2 includes communicating 214, at the remote computing device, data resulting from application of the computer vision function to the client computing device. Continuing the aforementioned example, the computing device 104 may receive the data from the server 102. Subsequently, the method includes implementing or completing 216, at the client computing device, computer vision functions. Continuing the aforementioned example, the computer vision application 110 may use the receive data for implementing or completing its operations or functions. These functions may depend on some level of image quality having metrics that depend on the specific demands of a particular task. For example, those demands may be edge detection, contrast recognition, distance measurements, normalization of images for just plain, trained object recognition, and/or the like. Data cleansing may be part of the image recognition, but can also be part of the real time processing and transmission.

In accordance with embodiments, a server may provide feedback to a client computing device about the usefulness of the data to its computer vision analyzer. For example, the client computing device may send, to the server, data resulting from a data optimization technique as described herein. FIG. 3 illustrates a flow chart of an example method for providing feedback about the usefulness of data to a computer visional analyzer in accordance with embodiments of the present disclosure. The method is described by example as being implemented by the system 100 shown in FIG. 1, although it should be understood that the method may be implemented by any suitable system.

Referring to FIG. 3, the method includes receiving 300, at a server, data resulting from a data optimization technique applied to images captured at a client computing device. For example, the client computing device 104 shown in FIG. 1 may capture images, apply a selected data optimization technique to the captured images, and send the resulting data to the server 102 as described by examples provided herein. The computer vision analyzer 114 of the server 102 may subsequently receive the data.

The method of FIG. 3 includes determining 302, at the server, feedback of usefulness of the data to a computer vision analyzer. Continuing the aforementioned example, the computer vision analyzer 114 may determine feedback for the client computing device 102 of usefulness of the data for implementing an offloaded computer vision function. The feedback can include algorithmic and/or AI techniques for determining video sensor and/or compression tuning parameters that are sensitive the success or failure of the applied computer vision task. Examples include, but are not limited to any of the list of H.264 algorithm tuning parameters, frame rate, I-frame rate, camera sensor settings, frame skipping, special processing for a specific region of interest, changing the overall resolution, picking selected blobs or regions of interest for additional resolution, adjusting smoothing algorithms, moving to grey scale, optimizing camera image settings like focus and exposure, and the like.

The method of FIG. 3 includes communicating 304, at the server, the feedback to the client computing device. Continuing the aforementioned example, the server 102 may communicate the feedback to the client computing device 104. The computer vision application 100 may receive the feedback.

The method of FIG. 3 includes adjusting 306, at the client computing device, application of the data optimization technique to other images based on the feedback. Continuing the aforementioned example, the computer vision application 110 may adjust application of the data optimization technique to other captured images based on the feedback. In an example, a frame rate of communication of video may be adjusted based on the feedback. Examples include, but are not limited to, overall frame rate, I-frame rate, and the like. Further, the data associated with these images may be communicated to the computer vision analyzer at the remote computing device.

In accordance with embodiments, the computer vision application 110 may determine whether acquired images are needed by the computer vision analyzer 114 at the server 102. This may be determined as being part of a computer vision requirement of the computer vision analyzer 114. In response to determining that the images are needed, the computer vision analyzer 114 may communicate the images to the server 102 for use by the computer vision analyzer 114. In an example, images or frames of video may be forwarded to the server 102 based on the computer vision requirement. In an example, a retail store may set up without a cashier at a checkout point. In this example, if the processor is able to determine an item has been picked up, then the routines may require much more image data about that item. It may be desired to have the resolution to determine whether the customer has lifted one or two items. In this case, it may not be desired to skip frames until the item either goes back on the shelf or in a shopping basket. Once the item is in more of a steady state location, frames may be skipped.

In accordance with embodiments, output of a sensor may be used for determining data and/or images to forward to the server 102 for use in implementing computer vision functions. For example, the client computing device 104 may include a sensor 118 configured to output metrics about a scene within the field-of-view of the image capture devices 108. The computer vision application 110 may use the metrics for use in determining a computer vision requirement. The output from other sensors, such as a store shelf scale or touch detection, in the case of the unattended store, can be used to supplement the data from the video. In the case where touch or intrusion is detected by another, non-video sensor, the compression, frame rate, and other bandwidth tuning parameters can be adjusted to provide more detailed data. Conversely, if there is no interaction indicated by other sensors, the server may not need more detailed data for that region of interest.

In accordance with embodiments, frame rates of acquired video may be adjusted based on feedback from a computer vision analyzer. The adjustment may be based on a computer vision application's ability to make needed decisions at a required confidence level.

In accordance with embodiments, a computer vision requirement may be met by skipping frames for some computer vision functions. For example, in H.264 video compression, multiple I-frames and P-frames can be skipped for some computer vision functions. As video indicates that detail may be needed downstream, a previous I-frame and follow-up P-frame may be indicated and made part of the provided stream.

In another example, upstream tiers closer to video or image acquisition may make decision to compress and reduce the bandwidth of what is forwarded across the network. Subsequently, downstream processing to request additional video and/or details that were not automatically included or forwarded. In this example, the sender may cache the full quality video until the requester has a chance to analyze the compressed or metadata that was forwarded. If the compressed or minimized data is provides a result with sufficient confidence, then the cached data may age out. However, if the receiver determines there was insufficient detail in the images for confident analysis, then it may request that the data be resent with setting that naturally consume more bandwidth. Resending data can be expensive, therefore tuning the sender's video selection and compression algorithms may be desired to avoid this request using AI and ML techniques.

In accordance with embodiments, application direct feedback may be in the form of data requests after compression and transmission. In addition, the application direct feedback may be in the form of application programming interfaces (APIs) that may be used by modified video compression algorithms. APIs may be implemented by an application for compression algorithms to provide input on whether a frame is needed or not. As an example, in a people tracking application where the application only needs to maintain the identify of a person, much less frequent video updates are needed if all the people it is tracking are farther apart and moving slowly as compared to them being close together and moving rapidly. In another example, an application provided API may consult with other sensors and fuse that data together to make frame transmission decisions.

The present subject matter may be a system, a method, and/or a computer program product. The computer program product may include a computer readable storage medium (or media) having computer readable program instructions thereon for causing a processor to carry out aspects of the present subject matter.

FIG. 4 illustrates a message flow diagram showing an example exchange of messages between a server 102 and a client computing device 104 for implementing a computer vision function in accordance with embodiments of the present disclosure. Referring to FIG. 4, initially the client computing device 104 may receive or capture images or video. Further, the client computing device 104 may determine a computer vision requirement at the server 102 for implementing a computer vision function to support the client computing device. In accordance with embodiments, the client computing device 104 may apply a selected data optimization technique to the images or video to generate data for communication to the server 102. Subsequently, the client computing device 104 may communicate 400 to the server 102 the data output from application of the data optimization technique to the images or video. The communication 400 may be preceded by or include a request for support of a computer vision function.

With continuing reference to FIG. 4, the server 102 may receive the communication 400 and determine whether to service the request for the computer vision function. If the request is accepted, the server 102 may implement the requested computer vision function based on the received data. Output data may result from implementation of the computer vision function. Subsequently, the server 102 may communicate 402 this output data to the client computing device 104.

The server 102 may also determine feedback to the client computing device 104 about the usefulness of the data communicated at 400. Usefulness is again application and algorithm specific, but can include parameters like finding edges, determining if objects have joined (been picked up a by a customer), measuring distances between features (in the case of facial recognition), etc. The feedback information may subsequently communicate 404 to the client computing device 104.

In response to receipt of the feedback, the client computing device 104 may adjust the data optimization technique previously applied to the images or video, re-apply the data optimization technique to the images or video, and communicate 406 the resulting data to the server 102. The server 102 may subsequently re-apply the computer vision function to this data. Alternatively, for example, the client computing device 104 may select and apply a different data optimization technique to the images or video, and subsequently send the resulting data to the server 102 for application of the computer vision function. Further, adjustments to a data optimization technique or selection of a data optimization technique based on the feedback may be applied to other images or video captured later.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method performed by a client computing device, the method comprising:
    offloading a computer vision analysis function to a remote computing device;
    applying a data optimization technique to a plurality of images to generate data for a first communication;
    communicating the data to the remote computing device;
    receiving feedback from the remote computing device based on the computer vision analysis function;
    adjusting the data optimization technique based on the feedback from the remote computing device;
    applying the adjusted data optimization technique to the plurality of images to generate adjusted data for a second communication;
    communicating the adjusted data to the remote computing device; and
    receiving result data from the remote computing device based upon a computer vision analysis of the adjusted data.

2. The method of claim 1, wherein the plurality of images are part of a video.

3. The method of claim 1, wherein the feedback is determined by the remote computing device based on high-dimensional data required by a computer vision analyzer at the remote computing device.

4. The method of claim 1, wherein the feedback is determined by the remote computing device based on a requirement of one of sharpness of edges, smoothness, white balance, and exposure.

5. The method of claim 1, wherein the feedback is determined by the remote computing device based on a determination whether images are needed by a computer vision analyzer at the remote computing device; and
    wherein the method further comprises forwarding images to the remote computing device based on whether the images are needed.

6. The method of claim 1, wherein a computer vision analyzer at the remote computing device is configured to one of process and analyze the images based on the data.

7. The method of claim 1, wherein a computer vision analyzer at the remote computing device is configured to, based on the data, one of perform scene reconstruction, detect an event, video track, recognize an object in video, estimate motion, and restore an image in video.

8. The method of claim 1, wherein the remote computing device is a server.

9. The method of claim 1, wherein the data optimization technique comprises generating the data by one of filtering, compression, image stitching, thresholding, pixel counting, segmentation, edge detection, color analysis, blob detection and extraction, machine learning, and pattern recognition.

10. The method of claim 1, wherein the data optimization technique comprises a video compression technique.

11. The method of claim 1, further comprising receiving, from the remote computing device, the computer vision requirement.

12. The method of claim 1,
    wherein receiving feedback comprises receiving, from the remote computing device, the feedback about usefulness of the data to a computer vision analyzer; and
    wherein the method further comprises adjusting application of the data optimization technique to other images based on the feedback.

13. The method of claim 1, wherein the images are video, and
    wherein adjusting of the data optimization technique comprises changing a frame rate of communication of the video.

14. The method of claim 1, wherein the determination of the computer vision requirement is determined at one or more centralized devices.

15. A method performed by a client computing device, the method comprising:
    offloading a computer vision analysis function to a remote computing device;
    applying a data optimization technique to a first plurality of images to generate data for a first communication;
    communicating, to a computer vision analyzer at a remote computing device, the generated data associated with a first plurality of images;

receiving, from the remote computing device, feedback about usefulness of the data to the computer vision analyzer based on the computer vision analysis function;

adjusting, based on the feedback, application of a data optimization technique to a second plurality of images;

communicating, to the computer vision analyzer at the remote computing device, data associated with the second plurality of images; and receiving result data from the remote computing device based upon a computer vision analysis of the second plurality of images.

16. The method of claim 15, wherein the images are video, and wherein adjusting application of the data optimization technique comprises changing a frame rate of communication of the video.

17. The method of claim 15, wherein the computer vision analyzer is configured to, based on the data, one of perform scene reconstruction, detect an event, video track, recognize an object in video, estimate motion, and restore an image in video.

18. The method of claim 15, wherein the data optimization technique comprises generating the data by one of filtering, compression, image stitching, thresholding, pixel counting, segmentation, edge detection, color analysis, blob detection and extraction, machine learning, and pattern recognition.

19. The method of claim 15, wherein the data optimization technique comprises a video compression technique.

20. A method performed by a server computing device, the method comprising:

receiving offload of a computer vision analysis function from a remote computing device;

receiving data associated with a first plurality of images having a data optimization technique applied thereto;

determining feedback of usefulness of the data to a computer vision analyzer based on the computer visional analysis function;

communicating the feedback to a client computing device for adjusting the data optimization technique to be applied to a second plurality of images for the computer vision analyzer;

receiving, from the client computing device, data associated with the second plurality of images having the adjusted data optimization technique applied thereto; and communicating, to the client computing device, result data based on the computer vision analysis of the received data associated with the second plurality of images.

* * * * *